Sept. 20, 1955　　　C. B. LEACH　　　2,718,221
COMBUSTION CHAMBER
Filed July 6, 1954

INVENTOR
Clayton B. Leach
BY L. D. Burch
ATTORNEY

United States Patent Office 2,718,221
Patented Sept. 20, 1955

2,718,221

COMBUSTION CHAMBER

Clayton B. Leach, Pontiac, Mich., assignor to General Motors Corporation, Detroit, Mich., a corporation of Delaware Application July 6, 1954, Serial No. 441,437

5 Claims. (Cl. 123—191)

This invention relates to combustion chambers for engines and has particular relation to combustion chambers especially applicable in the construction of high speed, V type, high compression ratio internal combustion engines for automotive and other uses.

In the construction of internal combustion engines for automotive and other uses it is necessary to combine low cost and efficient operation in the same engine structure. Among other factors cost may be considered to involve cost of labor, cost of material and cost of tools. Efficiency may be considered to involve volumetric efficiency, thermal efficiency, detonation, preignition, engine idling, roughness and other factors.

It is now proposed to construct an engine in which the combustion chamber materially contributes to the low cost of manufacture and to the efficiency of operation of the engine.

In the drawings:

Figure 2 is taken substantially in the plane of line 2—2 on Figure 1 looking in the direction of the arrows thereon.

Figure 3 is taken substantially in the plane of line 3—3 on Figure 1 looking in the direction of the arrows thereon.

Figure 1:
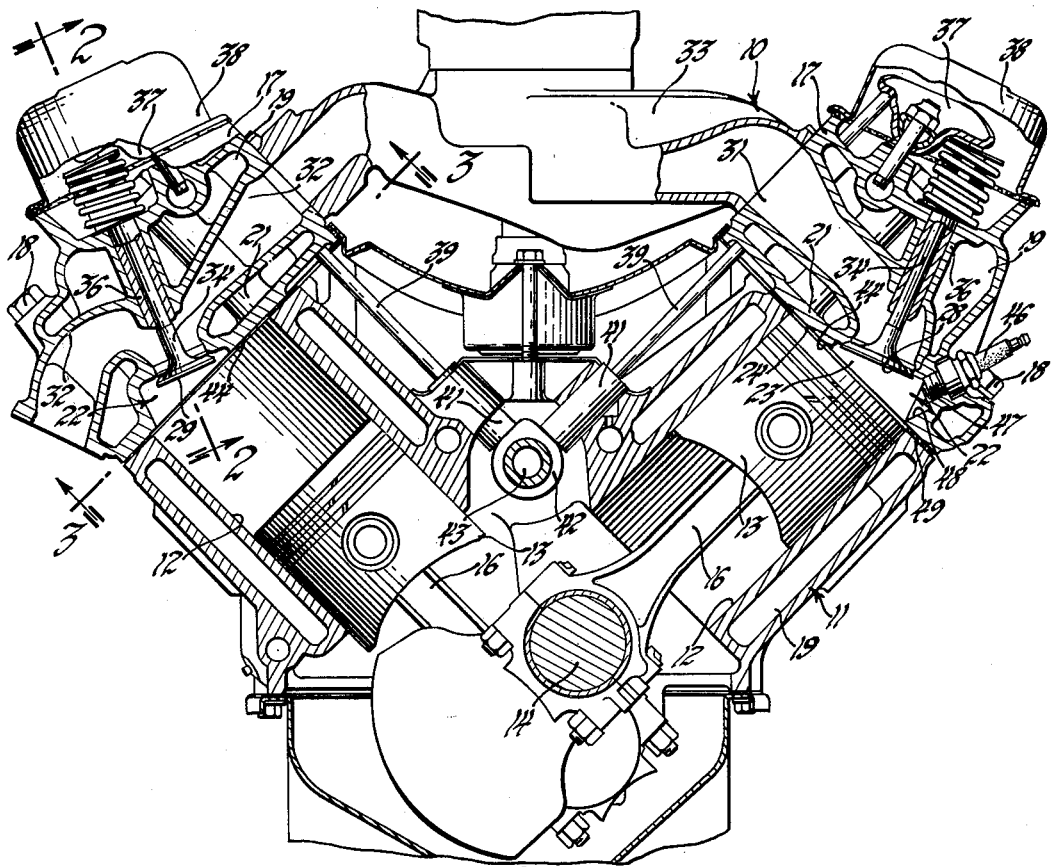
Figure 1 is a cross sectional view of a V type internal combustion engine employing combustion chambers embracing the principles of the invention.
Figure 2:
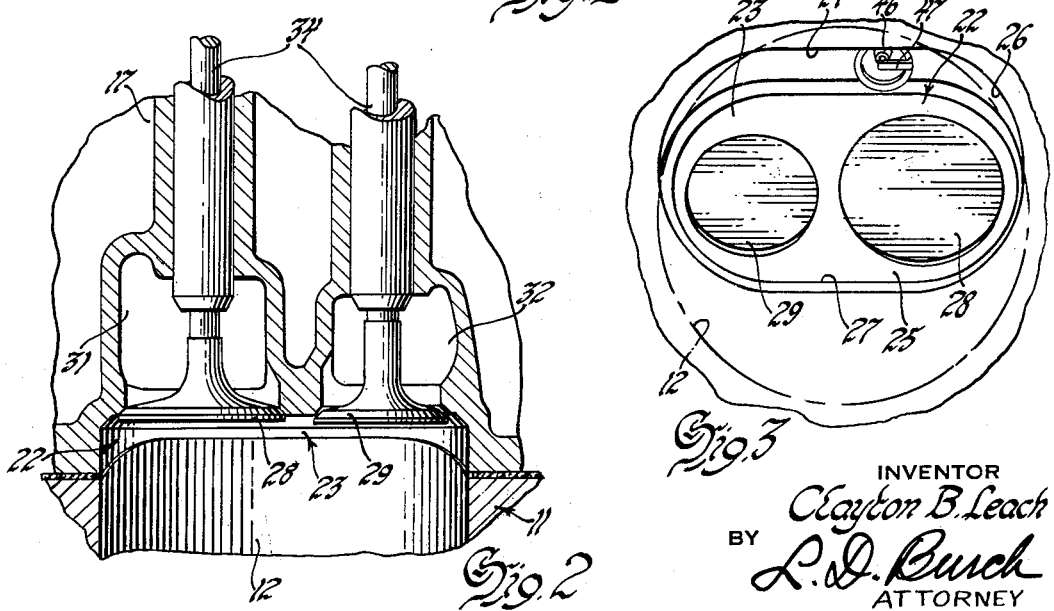
Figure 2 is a fragmentary cross sectional view through the combustion chamber in the engine disclosed by Figure 1, and in the plane of the stems of the inlet and exhaust valves for one of the cylinders of the engine.

The engine 10 embracing the invention comprises an engine block 11 having obliquely disposed rows of cylinders 12 formed therein. The cylinders 12 are adapted to receive pistons 13 operably connected to the crankshaft 14 of the engine by connecting rods 16. Each bank of the cylinders 12 in the block 11 has an engine head 17 secured thereto by bolts 18. The block 11 is formed to provide cooling cavities 19 surrounding the cylinders 12. The heads 17 are likewise provided with cooling cavities 19 for cooling the heads and the ends of the pistons 13. The heads 17 have inner walls 21 formed to provide plane surfaces extending across the ends of the cylinders 12 in parallel relation to the ends of the pistons 13 and preferably extending normally to the axes of the cylinders 12. The pistons 13 also preferably, although not necessarily, have plane end surfaces extending entirely across the ends of the pistons 13.

Each cylinder 12 of the engine is formed to provide a combustion chamber 22 comprising essentially a firing chamber 23 and a minimum mechanical clearance space 24. The firing chamber 23 is formed as an obliquely disposed depression in one side of the inner plane surface of the inner wall 21 of each of the heads 17. In order that it shall be possible to easily machine the inner surface of the firing chamber 23 it is proposed to form the surface as combined surfaces of revolution and translation. The side wall surfaces 26 are circular cylindrical surfaces whereas the side wall surfaces 27 are parallel plane surfaces tangent to the surfaces 26. The outer end surface 25 of the firing chamber is a plane surface normal to the surfaces 26 and 27.

It is apparent that it will be possible to machine the firing chamber 23 by feeding into one end of the chamber a right cylindrical cutting tool having the same diameter as the surfaces 26 and 27. When the end of the cutting tool has reached the end surface 25 then it will be possible to move the tool across the chamber to the opposite end thereof, thereby finishing all of the end wall surface 25 and the side wall surfaces 26 and 27.

Figure 3:
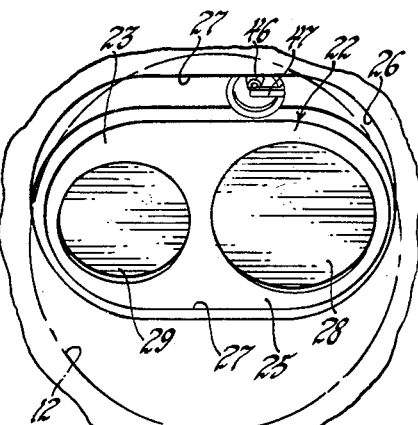
Figure 3 is a fragmentary plan view of the lower surface of an engine head employed in the engine disclosed by Figure 1, and illustrating particularly the firing chamber in the head and the inlet and exhaust valves opening into the firing chamber.

It is proposed to form the firing chamber 23 in each of the heads 17 in such manner that the lower edge of one of the side surfaces 27 will form a chord across the outside edge of each of the cylinders 12. Figure 3 shows one of the cylinders 12 as a dot and dash line and it will be noted that the lower edge of the outer one of the side walls 27 forms substantially a chord across the outer edge of the cylinder 12.

It is proposed to construct the firing chambers 23 in such manner that they will be substantially as long as the diameter of the cylinders 12. This will make the opposite ends of the firing chambers overlap the cylinders 12 to a slight extent and throughout a considerable part of the lower edges of the cylindrical side surfaces 26. The firing chambers 23 are made as long as possible in order to provide sufficient clearance around the inlet and exhaust valves 28 and 29 with which each cylinder 12 is provided. The inlet and exhaust valves are adapted to open through ports formed in the end walls 25 and in which inlet and exhaust passages 31 and 32 respectively terminate. The inlet passages 31 extend inwardly across the head 17 and through the cooling cavities 19 to the exhaust manifold 33 whereas the exhaust passages 32 extend outwardly through the cavities 19 where they may communicate with the ports of the exhaust manifolds of the engine. Also certain of the exhaust passages 32 may extend inwardly of the heads 17 to communicate with the heating passage employed in heating the intake manifold 33 of the engine.

The inlet and exhaust valves 28 and 29 for each cylinder 12 of the engine have valve stems 34 which are mounted in valve guides 36 formed in the heads 17 and through which the valve stems 34 project outwardly beyond the heads to be operated by valve operating mechanisms 37 located within covers 38 secured on the upper surfaces of each of the heads 17. The valve operating mechanisms 37 may be driven in any suitable manner as by push rods 39 seated in valve lifters 41 operated by cams 42 formed on the camshaft 43 of the engine 10. The camshaft 43 may be driven by any suitable timing gear by the crankshaft 14 of the engine and at one-half the speed of the crankshaft of the engine. It is preferred to have the seats for the inlet and exhaust valves 28 and 29 bored on the line of centers followed by the tool employed in finishing the firing chambers 23 or in parallel relation to such line of centers. In such event the stems 34 of the valves 28 and 29 will extend along axes parallel to the side surfaces 26 and 27 of the firing chambers 23.

Assuming the engine 10 to be a relatively wide bore, short stroke, high speed internal combustion engine for automotive purposes it is preferred to have the firing chambers 23 no wider than may be required to provide proper clearance for the inlet and exhaust valves 28 and 29. Under such circumstances it will be apparent that the firing chambers 23 may overlap the cylinders 12 to such an extent that the overlapping surfaces will provide a considerable squish area 44 on the inside of each of the cylinders 12 and the outer edge of which will extend inwardly toward and approach the axis of each of the cylinders 12. The spark plug 46 for each cylinder 12 of the engine is adapted to be mounted in a threaded opening which extends to the firing chamber 23 in such manner that the end of the plug and the ignition terminals 47 at the end of the plug will lie in a plane that is obliquely disposed and extends inwardly of the end surface 28 of each of the firing chambers 23. In order that the terminals 47 shall be adequately exposed to all of the interior of each of the firing chambers 23 it is proposed to relieve the outer side surfaces 27 of the firing chambers by providing recesses 48 that may be formed inwardly on an axis parallel to the axis of each spark plug 46. It is proposed to locate the spark plugs 46 in such manner that each spark plug will be somewhat closer to the inlet valve 28 and to the exhaust valve 29 in each firing chamber 23.

In order to provide high turbulence in each combustion chamber of the engine it is proposed to make the mechanical clearance space 24 relatively small. This may be done in any suitable manner as by providing a gasket 49 on which each head of the engine rests and which preferably is as thin as possible within practical limits. Gaskets of from .015 to .100 of an inch in thickness may be found to be satisfactory. Under such circumstances it is possible to employ pistons 13 with end walls normal to the axes of the pistons and the end surfaces of the pistons may be permitted to move to the outer extremities of the cylinders 12 when the pistons 13 are in outer dead center positions therein.

While the firing chambers 23 may comprise the greater part of the volume of each of the combustion chambers 22 there nevertheless will be a considerable volume of the charge in the mechanical clearance spaces 24 where the adjacent wall surfaces are relatively cool and where the wall surface to volume ratio is much higher than within the firing chambers 23.

The firing chambers 23 may be made variable in depth in order to provide the desired compression ratio for the engine. In the present instance the firing chambers 23 are designed to operate at a compression ratio of 8.25 to 1, more or less, with commercial fuels now available.

On the suction stroke of the engine 10 the inlet valves 28 will open and combustible charges will be supplied to the combustion chambers 22 for the cylinders 12 by the inlet passages 31. It will be noted that as the valves 28 open the fluid will flow outwardly into the firing chambers 23 in parallel relation to the seating surfaces of the valves 28 and that the terminals 47 of the spark plugs 46 will be traversed by the incoming mixture. This will carry any exhaust gas away from the terminals that may remain in the cylinder after the previous exhaust stroke of the engine and will insure that a proper mixture will be adjacent the terminals 47 when ignition occurs. When the pistons 13 approach the upper dead center positions in the cylinders 12 on the compression stroke in each cylinder it will be apparent that the squish area 44 will block the outward movement of the charge in a large part of each cylinder. This will result in a violent lateral movement of the charge being compressed beneath the squish area and will cause a blast of fluid to be projected at a very high velocity across the lower part of each firing chamber 23. This blast of fluid will strike the opposite side wall 27 of the firing chamber and will be deflected upwardly and across the terminals of the plugs 46 and inwardly at the top of the chambers and across the inlet and exhaust valves 28 and 29. Also on the compression stroke of the engine it will be noted that the chord formed by the lower edge of each of the outer side walls 27 of the firing chambers 23 will deflect inwardly and away from the terminals 47 of the plugs 46 any oil that may have been scraped from the cylinders by the upper edges of the pistons. Such oil might otherwise be projected outwardly and upon the terminals 47 of the spark plug 46. When ignition occurs at the terminals 47 it will be apparent that the mixture will readily burn at the terminals 47 regardless of whether the engine is operating at low or high speed. The mixture will burn from the terminals 47 in all directions outwardly and across the firing chambers 23 and toward the edge of the minimum mechanical clearance space 24 at the opposite side of each firing chamber. While the burning may reach the end of each firing chamber 23 adjacent the inlet valve 28 therein before it reaches the opposite end adjacent the exhaust valve 29 it will be apparent that detonation at the exhaust valve end of each firing chamber will tend to be prevented by the fact that the mixture at the exhaust valve end of the chamber will contain practically all of whatever exhaust gas may have remained in the cylinder at the end of the exhaust stroke of the cylinder. Such exhaust gas will tend to dilute the mixture and to prevent the spontaneous combustion which is characteristic of detonation. The part of the charge which is last to burn will be in the minimum mechanical clearance space on the side of the cylinder opposite the spark plug. Notwithstanding the high pressure and density affecting this part of the charge detonation will tend to be prevented by the fact that the space is shallow and the surface to volume ratio is high. The surfaces of the piston and the head will tend to cool the charge in the mechanical clearance space and to slow down the rate of burning so that this part of the charge may burn normally and without detonation.

I claim:

1. A combustion chamber for engines comprising a cylinder having a piston adapted to reciprocate therein and a head for said cylinder, an obliquely disposed firing chamber formed in said head and forming a part of said combustion chamber, said firing chamber being formed to provide continuous side walls around the sides and an end wall at the outer end of said firing chamber, said side walls being formed to provide spaced and opposed surfaces of revolution connected by spaced and parallel surfaces of translation and with the lower edge of one of said walls forming substantially a chord across said cylinder at one side of said cylinder, a minimum mechanical clearance space formed between said head and said piston when said piston is at upper dead center position in said cylinder and forming another part of said combustion chamber, said firing chamber being in open communication with said minimum mechanical clearance space at the inner extremity of said firing chamber, said minimum mechanical clearance space at the side of said cylinder opposite said chord forming a substantial squish area extending inwardly toward and approaching the axis of said cylinder for creating a substantial turbulence in said firing chamber as said piston approaches said upper dead center position and in said cylinder, a pair of inlet and exhaust valves mounted in said head and being adapted to close inlet and exhaust passages formed in said head, said valves being adapted to open through ports in said end wall of said firing chamber and being operable on stems parallel to said side walls of said firing chamber, and a spark plug mounted in said head and extending into said firing chamber, said spark plug being positioned in said head with the axis thereof disposed obliquely with respect to said stems of said valves to position the end of said spark plug carrying the spark gap terminals thereof obliquely to said end wall of said firing chamber so that the charge admitted to said cylinder through the intake port for said cylinder will flow over said spark gap terminals for conditioning said terminals for igniting said charge, said spark plug being adapted to project into said firing chamber on the side of said firing chamber adjacent said chord whereby said ignition terminals of said spark plug will be shielded from oil scraped by said piston from said side of said cylinder.

2. A combustion chamber as defined by claim 1 and in which said spark plug is disposed in a recess in said one of said side walls adjacent said chord and in directly opposed relation to said squish area at the opposite side of said cylinder.

3. A combustion chamber for engines as defined by claim 1 and in which said spark plug is located in the end of said firing chamber in which the inlet valve for said cylinder is located.

4. A combustion chamber for engines as defined by claim 1 and in which a part of said minimum mechanical clearance space is outwardly beyond said chord and between said spark plug and the outer edge of said cylinder.

5. A combustion chamber for engines as defined by claim 1 and in which said squish area extends inwardly toward the axis of said cylinder and inwardly of the end wall of said firing chamber and the seating surfaces for said valves so that a turbulent blast of said charge will be directed across said cylinder and adjacent the end of said piston and backwardly across said valves as said piston approaches the upper dead center position of said piston in said cylinder.

References Cited in the file of this patent
FOREIGN PATENTS 466,677   Great Britain _____ June 2, 1937

OTHER REFERENCES

Automotive Industries, May 1, 1953, pages 54 to 60, incl.